United States Patent
Stevens et al.

(10) Patent No.: US 7,181,064 B1
(45) Date of Patent: Feb. 20, 2007

(54) HISTOGRAM-BASED COLOR CONSISTENCY MEASURE FOR SCENE RECONSTRUCTION

(75) Inventors: Mark R. Stevens, Worcester, MA (US); William B. Culbertson, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 932 days.

(21) Appl. No.: 09/987,918

(22) Filed: Nov. 16, 2001

(51) Int. Cl.
*G06K 9/00* (2006.01)

(52) U.S. Cl. .................. 382/165; 382/154; 382/170

(58) Field of Classification Search ............ 382/154, 382/164, 165, 168, 170, 192, 194, 224, 282; 345/419, 420, 424

See application file for complete search history.

(56) References Cited

U.S. PATENT DOCUMENTS

| | | | |
|---|---|---|---|
| 4,985,856 A * | 1/1991 | Kaufman et al. | 345/424 |
| 6,363,170 B1 * | 3/2002 | Seitz et al. | 382/154 |
| 6,691,126 B1 * | 2/2004 | Syeda-Mahmood | 382/104 |
| 6,711,288 B2 * | 3/2004 | Kim et al. | 382/165 |
| 6,721,449 B1 * | 4/2004 | Krishnamachari | 382/165 |

OTHER PUBLICATIONS

Stevens et al. "Pose from Color." Proceedings of the 15th International Conference on Pattern Recognition, vol. 3, Sep. 2000, pp. 718-721.*

Moghaddam et al. "Image Retrieval with Local and Spatial Queries." Proceedings of the 2000 International Conference on Image Processing, vol. 2, Sep. 2000, pp. 542-545.*

Seitz, Steven M., et al., "Photorealistic Scene Reconstruction by Voxel Coloring", In Proc. Computer Vision and Pattern Recognition Conf., pp. 1067-1073, 1997.

Culbertson, W. Bruce, et al., "Generalized Voxel Coloring", Vision Algorithms: Theory and Practice Springer Verlag Lecture Notes in Computer Science. vol. 1883, Sep. 1999, pp. 100-115.

Beltrame, Francesco, et al., "Use of 24-bit False-Color Imagery to Enhance Visualization of Multiparameter MR Images", Magma (1994) 2, pp. 551-558.

Swain, Michael J., et al., "Color Indexing", International Journal of Computer Vision, 7:1, pp. 11-32 (1991).

* cited by examiner

*Primary Examiner*—Vikkram Bali
*Assistant Examiner*—Colin LaRose

(57) ABSTRACT

A method of testing for color consistency between corresponding portions of two-dimensional images or photographs that are used to create three-dimensional models of scenes or objects. The testing method makes use of histograms in order to determine whether color consistency exists. In the event that color consistency does exist, voxels or other modeling primitives that are viewed in the portions of the images tested are included in the three-dimensional model.

2 Claims, 6 Drawing Sheets

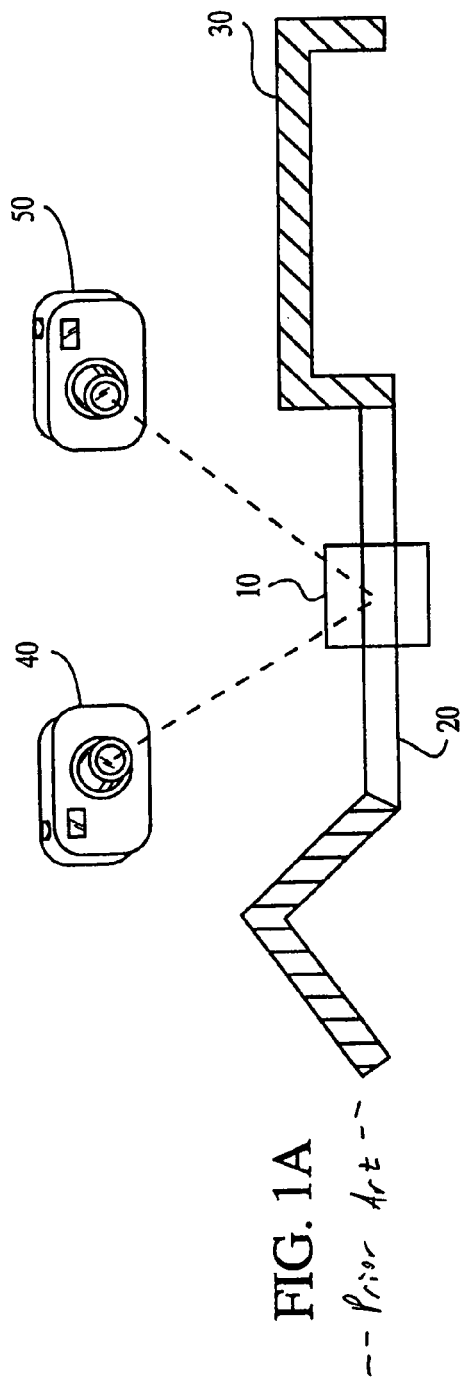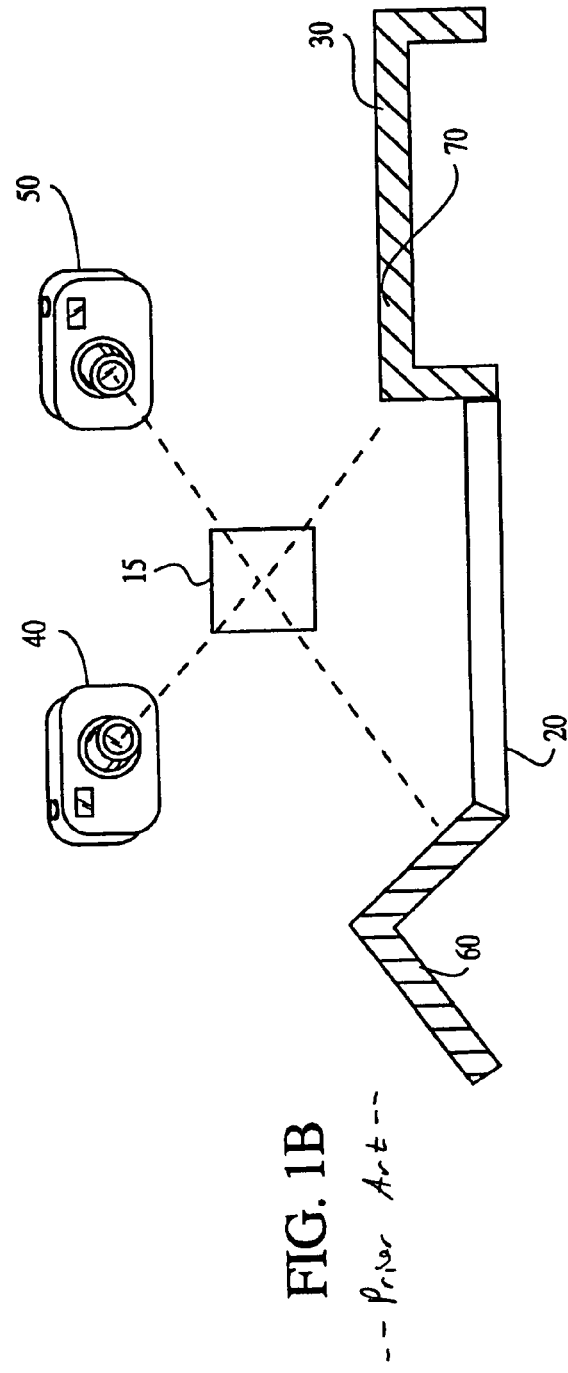
FIG. 1A -- Prior Art --
FIG. 1B -- Prior Art --

HISTOGRAM-BASED COLOR CONSISTENCY MEASURE FOR SCENE RECONSTRUCTION

FIELD OF THE INVENTION

The present invention relates generally to three-dimensional modeling methods.

BACKGROUND OF THE INVENTION

Scene reconstruction involves building three-dimensional, computer models of scenes, given several two-dimensional images or photographs of the scenes. In order to create the models, reconstruction algorithms are typically used. However, these algorithms need a rule or a set of rules to determine where the surfaces and regions shown in the photographs should be represented in the three-dimensional models.

One rule that can be used for building three-dimensional models from two-dimensional images is based on color consistency. However, in order for the color consistency rule to be successfully applied, the surfaces of the scene should be Lambertian. In other words, the surfaces should reflect light equally in all directions, or at least nearly so. In particular, it is preferable that the surfaces not be shiny or mirrored.

FIG. 1A illustrates a point 10 on a surface 20 of a scene 30 that is being imaged or photographed by a first camera 40 and a second camera 50. The cameras 40, 50 are at different angles relative to the surface 20. As shown in FIG. 1A, the point 10 on the surface 20 will appear to have consistent (i.e., similar) color from every image or photograph that includes it, regardless of the angle from which the image is taken. In other words, the point 10 will have the same color in a first image taken by the first camera 40 and in a second image taken by the second camera 50, even though the camera angle is different.

In contrast, FIG. 1B illustrates two cameras 40, 50 taking images of a point 15 that is not on the surface 20 of the scene 30. Since each of the cameras 40, 50 has an unoccluded view of other surfaces 60, 70 beyond the point 15, and since the other surfaces 60, 70 beyond the point 15 will, in general, have inconsistent colors, there will not be any color consistency of the images at the point 15 in question. Therefore, surface points 10 and non-surface points 15 can be distinguished based on the color consistency of the points from image to image. Then, based on where surface points are present, the locations of the surfaces of the scene can be determined and three-dimensional models can be formed.

Reconstruction of a three-dimensional model from two-dimensional images is typically simplified by assuming that the images are calibrated. This means that various camera parameters, including camera position and orientation, are known and that, given a point in the three-dimensional scene, it can be determined where the point will appear in the photographs. If color images of the scene are obtained by some means other than photography, those images can be used in place of photographs for reconstructing the scene.

Once the locations of the surfaces of the scene have been determined, the surfaces can be three-dimensionally modeled using voxels or other modeling primitives such as polygons. Voxels, which are three-dimensional volume elements analogous to two-dimensional pixels, can be thought of as tiny cubes that typically occur on a regular grid. As voxels get smaller and smaller, they approximate points.

In model building, voxels or other modeling primitives can be opaque to represent a surface of the scene. They can also be transparent to represent air or space that is not occupied by any surface or, if it has not yet been determined whether the voxels are part of the surface, the voxels can be left in an undefined state that signifies that a final determination concerning the voxel has not yet been made.

The reconstruction algorithms based on color consistency typically test a large number of voxels or other primitives at specific locations to build a model. If the voxels or other primitives are found to have consistent color in the photographs, they are added to the model. On the other hand, if they are found to be inconsistent, the voxels or other primitives are removed from the model. Voxels that are in the undefined state described above are generally technically neither added nor removed from the model. Instead, they are simply not used until their color consistency can be determined.

Typically, the two-dimensional images or photographs used in scene reconstruction are either captured as digital images, using a digital camera, or taken with a conventional film camera and then digitized using a scanner. The digital images are typically composed of rows and columns of picture elements, pixels, or other image partitions that each have a color. Based on the color of the image partition, a number or an array of numbers can be assigned to the pixel.

Many different schemes, called color spaces, are used to encode pixel color. Many of these color spaces have multiple dimensions. For example, the Red-Green-Blue (RGB) color space has three dimensions: red, green, and blue, and each color is assigned a numerical array value based on the amount of red, green, and blue that is contained in the color of the pixel. For example, a color that is 10% red, 33% green, and 57% blue could be assigned an array value of (10, 33, 57) while a color that is 100% green could be assigned the (0, 100, 0) array value.

Unlike dimensionless points, voxels and other primitives have nonzero size and, if they are visible from one of the photographs, they are generally visible from a number of pixels in the photographs. Hence, if V is a voxel or other modeling primitive and i is a photograph, then $S_{V,i}$ is the subset of image partitions or pixels in i from which V is visible. $S_{V,i}$ can also be called the visibility set of primitive V in photograph i.

In modeling methods that make use of color consistency, a voxel or other modeling primitive is considered to be color consistent if all of its visibility sets are of a consistent color. However, pixels and visibility sets have been defined as having a consistent color in a number of different ways according to the related art. Hence, there is ambiguity in the related art concerning color consistency rules.

According to some related art methods, given a number, n, of pixels with colors of numerical value, $x^i$, their mean color, $\mu$, can be computed as:

$$\mu = \left( \frac{\sum_{i=0}^{n-1} x^i_{red}}{n}, \frac{\sum_{i=0}^{n-1} x^i_{green}}{n}, \frac{\sum_{i=0}^{n-1} x^i_{blue}}{n} \right),$$

and the color variance, $\sigma^2$, of the pixels can be computed as $$\sigma^2 = \frac{1}{n}\sum_{i=0}^{n-1}\left((x_{red}^i - \mu_{red})^2 + (x_{green}^i - \mu_{green})^2 + (x_{blue}^i - \mu_{blue})^2\right).$$

The standard deviation of color of the pixels can then be computed as $\sigma$, the square root of the variance.

It is known in the related art to use monochrome images rather than color images to construct a three-dimensional model. When monochrome images are used, each shade of gray is assigned a different numerical value. Then, if a voxel is visible from two pixels whose gray values differ by more than some threshold (typically 10–15), the voxels are considered to have inconsistent color.

When the color consistency of a voxel V is tested according to some related art methods, the visibility sets of V in each image are computed only approximately. Rather than finding the true projection of V into an image, some related art methods simplify the computation by assuming the projection will be a square of an appropriate size.

According to these methods, the first step in computing the color consistency of V is to find the set S of pixels that is the union of all the pixels in all such squares. Then the method computes the variance, $\sigma^2$, and the likelihood ratio test, $\lambda_V$, of S, wherein $\lambda_V$ is defined as $(n-1)\sigma^2$ when S consists of n pixels. Finally, some of these methods consider the voxel to be color consistent if $\lambda_V$ is less than some experimentally-found threshold that yields the best three-dimensional model.

According to yet other methods, when the color consistency of a voxel V is tested, the voxel's visibility sets (the $S_{V,i}$'s) are first found in each of the images analyzed. Then, the mean color $\mu_i$ of each non-empty $S_{V,i}$ s found. When there are m such $S_{V,i}$, then the likelihood ratio test $\lambda_V$, defined as $(m-1)\sigma^2$, of the m mean colors is computed.

According to these methods, the $\lambda_V$ is computed over a different number of colors than in the methods previously discussed. Namely, the ratio test is now computed over the number of images from which V is visible rather than over the number of pixels from which V is visible. Finally, like in the other methods, the voxel is considered to be color consistent if $\lambda_V$ is less than some experimentally-found threshold.

In some methods, the color consistency of a voxel V is computed by first finding the visibility sets of V for all of the images. Then, the variance of the union of the visibility sets is computed. According to these methods, the voxel is considered to be color consistent if the variance is less than some threshold that is found experimentally.

Yet other methods begins their voxel color consistency computations by first finding the visibility sets of the voxel (the $S_{V,i}$'s) for all the images. Then, the mean color $\mu_i$ of each non-empty $S_{V,i}$ is computed. At that point, for every pair $\mu_i$ and $\mu_j$ of such means, the $L_1$ norm of $\mu_i$ and $\mu_j$, is computed, wherein the $L_1$ norm is defined as:

$$\text{norm}_{i,j} = (|\mu_{i\ red} - \mu_{j\ red}| + |\mu_{i\ green} - \mu_{j\ green}| + |\mu_{i\ blue} - \mu_{j\ blue}|).$$

If the maximum of these norms is less than a threshold that is determined experimentally, then the voxel is considered to be color consistent.

As shown above, related art color consistency measures all rely on experimentally determined threshold values. In order to set the threshold values, many reconstructions are performed using different thresholds and the best model is kept. Since each reconstruction takes considerable time, this process is very tedious. Furthermore, one threshold value sometimes works best on one part of a scene while a different threshold value works best elsewhere. Hence, there may be no single best threshold value. The histogram-based consistency measures of the present invention do not use a threshold and thereby eliminate these problems.

The related art has also made use of color histograms, which are a well known statistical device. However, color histograms have never been used for color consistency testing in scene reconstruction. Rather, color histograms have generally been used for indexing in databases of images. Specifically, given a color histogram, images with similar color histograms are retrieved from the database.

Another application of histograms has been in image segmentation. In these applications, regions of an image with similarly-colored histograms are identified. Histogram-based image segmentation has been useful in medical imaging.

SUMMARY OF THE INVENTION

A method of measuring color consistency including obtaining a first two-dimensional image and a second two-dimensional image of an object, subdividing the first image into a first set of image partitions and the second image into a second set of image partitions, each image partition having a color, selecting a first subset of image partitions in the first set of image partitions and a second subset of image partitions in the second set of image partitions based upon a criteria related to a three-dimensional region of the object, assigning each image partition in the first subset and each image partition in the second subset a color value corresponding to the color of the image partition, placing each image partition in the first subset in one of a first series of histogram subdivisions and each image partition in the second subset in one of a second series of histogram subdivisions based on the color value of each image partition, comparing the first series of histogram subdivisions to the second series of histogram subdivisions, and processing the region based on whether the first series of histogram subdivisions and the second series of histogram subdivisions have a similarity.

A computer program product including a computer-readable medium containing instructions for controlling a computer system to perform a method of measuring color consistency, the method including obtaining a first two-dimensional image and a second two-dimensional image of an object, subdividing the first image into a first set of image partitions and the second image into a second set of image partitions, each image partition having a color, selecting a first subset of image partitions in the first set of image partitions and a second subset of image partitions in the second set of image partitions based upon criteria related to a three-dimensional region of the object, placing each image partition in the first subset in one of a first series of histogram subdivisions and each image partition in the second subset in one of a second series of histogram subdivisions based on the color value of each image partition, comparing the first series of histogram subdivisions to the second series of histogram subdivisions, and including the region in a three-dimensional model of the object if the first series of histogram subdivisions and the second series of histogram subdivisions have a similarity.

BRIEF DESCRIPTION OF THE DRAWINGS

The invention will be described by way of example, in the description of exemplary embodiments, with particular reference to the accompanying drawings in which:

FIG. 1A illustrates two cameras that detect consistent colors at a point on a surface;

FIG. 1B illustrates two cameras that detect inconsistent colors at a point not on a surface;

DETAILED DESCRIPTION OF THE INVENTION

Figure 2A:
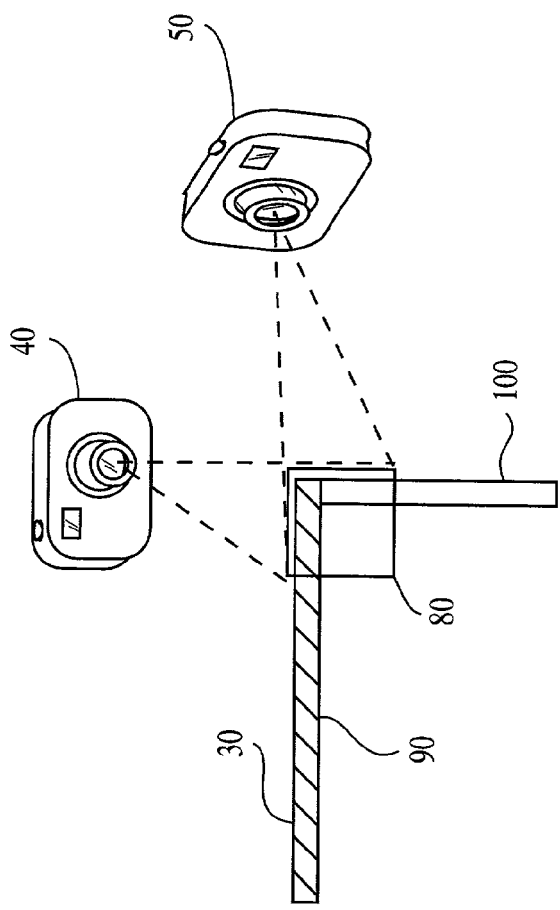
FIG. 2A illustrates two cameras that view a voxel at a corner with a black surface and a white surface.

Three-dimensional modeling of scenes using two-dimensional images and color consistency can be performed in a variety of ways according to the present invention. Further, the modeling concepts and methods used for scene modeling or reconstruction can also be applied to the modeling of other three-dimensional objects.

Certain modeling methods can make use of images made in the RGB color space described above and can also use other color spaces, not described herein but well-known to those skilled in the art of the present invention. The modeling methods of the present invention can be used with almost any reconstruction algorithm that uses color consistency. The methods can also use a consistency criteria related to a feature of a three-dimensional region of the object that is something other than the color of the region.

As an illustrative example of the types of algorithms that can be used, the Generalized Voxel Coloring (GVC) algorithm is discussed below. The GVC algorithm creates a three-dimensional model composed of voxels wherein each voxel can be transparent or opaque and wherein opaque voxels can have a color.

Before running a GVC algorithm, a collection of voxels is chosen that amply contains the scene, the portion of the scene or the object to be modeled. Initially, the model includes a large number of voxels and bears little resemblance to the scene or object. As the algorithm runs, however, the model is improved by carving (i.e., removing from the model) voxels or other modeling primitives that have inconsistent colors in the photographs from which they are visible.

In practice, a voxel or other modeling primitive is included in the model if it is opaque and is carved out of the model when it is transparent. As discussed above, the voxel or other modeling primitive can also be in an undefined state of limbo.

All of the voxels can initially be considered to be part of the model and can be set to be opaque when the algorithm begins. In these embodiments, the algorithm stops carving when all the remaining opaque voxels project to consistent colors in the images. Alternatively, all of the voxels can initially be transparent and the voxels are added to the model by being turned opaque after the voxels have passed a color consistency test.

Each opaque voxel or other modeling primitive can be assigned a color that is the average of all of the colors of all of the image pixels that can see it. In other words, each opaque voxel can be assigned the average color of all of the pixels or image partitions in its visibility sets.

Alternatively, the color of the voxels can be assigned by projecting the input photographs onto them. By this method, the input images can be used to texture map the voxels. When the voxels are colored either by assigning an average color or by projecting an image, the voxels collectively resemble the scene or object and, hence, provide a good three-dimensional model of the scene or object.

In order to find the pixels in an image from which a voxel is visible, the voxel can first be considered to be a cube. Then, the six sides of the voxel can be projected into the image. All pixels whose centers fall within the projection are then added to the subset of image partitions, $S_{V,i}$.

Once subsets of image partitions that include the voxel or other modeling primitive are identified, the subsets can be analyzed for color consistency. A definition for color consistency that is particularly effective and, furthermore, that provides a step-by-step procedure for testing sets of pixels for color consistency makes use of histograms. As stated above, histograms are commonly used in statistics to categorize a set of samples. Histograms count of the number of samples that fall into each of a number of categories, commonly represented as histogram subdivisions or histogram bins.

According to some of the methods of the present invention, the samples that fall into the histogram subdivisions or bins after being categorized are the pixels in the visibility sets of a voxel or other modeling primitive. Once all of the samples have been placed in bins, a count of the number of samples that fall into each category or bin can be made and a histogram can be formed.

Most digital image formats provide a very large number of possible colors for each pixel. For example, some RBG-based images provide 256 possible values for each of the three color channels (red, green, and blue) for a total of more than 16 million possible combinations of array values for the color of each pixel. However, according to certain embodiments of the present invention, fewer bins, such as 512 bins, can be used, though the number of bins is not critical.

Therefore, in order to go from a 16-million-bin histogram to a 512-bin histogram, larger bins can be used. These larger bins, which can be called histogram partitions, encompass several histogram subdivisions into a single-valued histogram partition. In other words, using histogram partitions places several similar color values into one histogram partition and reduces the overall number of bins in the histogram.

One advantage that the smaller number of larger bins provides is compensation for slight variations in detected color. For example, due to shortcomings of current camera technology, one camera may detect that the color of a point on the surface is in the 13-millionth bin in a first image while a second camera may detect that color of the same point is in the 13-millionth-and-first bin. In this case, it may not be accurate to remove the voxel from the model. Thus, fewer, larger bins, in some circumstances, will more accurately detect color consistency for the purposes of the embodiments of the present invention.

Although there are many methods that can be used for reducing the number of bins needed, and although many of these methods can be used according to the embodiments of the present invention, only one representative example is detailed herein. Specifically, the example discusses the RGB color space.

In the RGB color space, numbers between 0 and 255 can be used to specify the amount of red, green, and blue in a color. Since each color could then be assigned one of over 16 million array values (256×256×256) this would lead to having to process histogram that have over 16 million bins. Since histograms with fewer bins can sometimes be more convenient, each of the red, green, and blue values can be grouped into larger bins. This can be done by grouping the possible red, green, and blue values into eight larger bins that contain the original values: 0 to 31, 32 to 63, and so forth, respectively.

The larger bins, or histogram partitions, can then be numbered from 0 to 7. Thus, given a red value between 0 and 255, it is possible to find the larger red bin (numbered between 0 and 7) that includes the value of the histogram subdivision. It is also possible to do the same for the green and blue values. Hence, given a color that is specified by a triple of red, green, and blue values between 0 and 255, it is possible to categorize the color into a trio of array values between 0 and 7. Then, the 512 (i.e., 8×8×8) possible trios of array values can serve as the larger bins of a color histogram and finding the larger bin that a particular color belongs to it is relatively straightforward.

Using the histogram-based approach, it becomes possible to define color consistency in a manner more suited to scene and object reconstruction. It also becomes possible to elaborate on one possible method of testing the color consistency of the voxel or other modeling primitive.

As discussed above, a modeling primitive can be defined to be color consistent if its visibility sets are color consistent. Hence, it is now necessary to define what it means for a primitive's visibility sets (i.e., a number of sets of pixels) to be color consistent. In order to achieve this goal, the requirements for two sets of pixels to have consistent color are presented. Then, the idea behind these requirements are extended to many sets of pixels.

When testing the color consistency of two sets of pixels, one possible method calls for first constructing histograms of the sets, either with histogram subdivisions or broader histogram partitions, and then testing the histograms for color consistency. There are many ways to compare two histograms according to the present invention. However, the particular histogram comparison described below works adequately as an illustrative example.

This method includes specifying that two histograms intersect if, for at least one bin, both histograms have non-zero counts. In other words, two histograms intersect if at least one pixel in one of the sets of pixels has a very similar color to a pixel in the other set.

If a set contains only a very small number of pixels, or even no pixels at all, that represent the portion of the scene or object being modeled by the voxel or other modeling primitive, then a histogram may not provide a very effective measure of the set's colors. Hence, for convenience, a set with fewer than some minimum number of pixels can either be defined to be consistent with all other sets of pixels or can be placed in the undefined state mentioned above, depending on the details of the particular algorithm being used. Otherwise, two sets of pixels are defined to be consistent if their histograms intersect.

Now that color consistency between two sets of pixels has been defined, color consistency for multiple sets of pixels can be defined. More specifically, when many sets of pixels are compared, all of the sets can be defined as being color consistent if every pair of the sets is color consistent.

If, for example, a color-consistency-based reconstruction algorithm is run on N photographs, the algorithm will need to decide whether to include particular voxels or other modeling primitives in the model of the scene or object. The voxels or other primitives will be included in the model if there is color consistency and there will be color consistency if the N visibility sets, $S_{V,i}$ for $0 \leq i < N$, are color consistent as defined above.

According to certain embodiments of the present invention, only visibility sets with a number of pixels above a threshold number are considered when computing color consistency. If such a specified threshold number is not exceeded, for at least two images, then the consistency measure provides no basis for including or not including the voxel in the model. Hence, the number of visibility sets used to compute the color consistency of a voxel, is sometimes less than N, the number of photographs.

The voxel color consistency test, as described above, has a deficiency in that it treats color values that fall near bin boundaries differently than other colors. To illustrate, for colors that have the same green and blue values, the behavior of just the red value can greatly affect the way the colors are treated. For example, when a pixel has a red value of 15, it may fall in the middle of its bin and another pixel with a red value in the range 15±15 may be counted in the same bin. Then, if these two pixels are in two different visibility sets, the sets will have intersecting histograms and consequently will be considered to have consistent color.

On the other hand, two pixels with red values 31 and 32 are as close as they can be in color, yet, depending on how bin boundaries are selected, the pixels may be counted in different bins. If they are counted in separate bins, these two red values would not be sufficient to make the algorithm view the two visibility sets as being consistent in color.

Since the choice of bin boundaries according to the present invention can be somewhat arbitrary, it would be beneficial for the color consistency test to be insensitive to the exact placement of the boundaries. Furthermore, color can only rarely be measured exactly. For example, a camera may measure slightly different color values on successive exposures of the identical scene or object. Also, lighting of the surfaces of the scene or object can change slightly over time, causing minor shifts in color. Hence, for a number of reasons, it is preferable for the consistency test to ignore small differences in color.

The problems just described can be corrected by using overlapping bins. In effect, overlapping bins blur the bin boundaries. Hence, the bins can be enlarged to overlap adjacent bins by about 20 percent, though larger and smaller overlaps are also within the scope of the present invention. Thus, a pixel with a color falling into multiple overlapping bins is counted in each such bin while a pixel falling into just one bin is counted in just that bin, as before. This makes the consistency test insensitive to bin boundaries and small inaccuracies in color measurement.

Because the resolution of the models improves, scenes and objects can be more accurately modeled as the size of the voxels or other modeling primitives is reduced. In the limit as the size of the voxels or other primitives approaches zero, each projects to a point, and hence a single color, in each two-dimensional input image.

Unfortunately, runtime and memory requirements for scene reconstruction algorithms increase with the number of voxels or other primitives used, which tends to be inversely proportional to the primitive size. In practice, this typically forces the use of fairly large primitives. For example, in a voxel-based method, voxels typically project to between 10 and 100 pixels in the input photographs, and these pixels may not be exactly the same color as the voxels that represent the surfaces of objects in the scene.

In fact, in certain circumstances, a single voxel or other modeling primitive might represent a portion of a surface in the scene that spans abrupt color boundaries. Such a circumstance is illustrated in FIG. 2A where a voxel 80 partially includes a black portion 90 of a scene 30 and a white portion 100 of the same scene 30. As shown, the voxel 80 or other primitive can be projected to pixels with dramatically different colors in even a single input image. In such situations, the distribution of colors is said to be multi-modal since the colors tend to cluster into several groups, with the colors in each group being similar to each other but possibly quite different from the colors in other groups.

When reconstructing a model of a scene or object, voxels or other modeling primitives are generally only included in the scene model if they have consistent colors when viewed from the photographs that can see them. However, since voxels and other primitives that should be included in such models can sometimes be visible from pixels with multi-modal color distributions in the photographs, it is important that color consistency be sometimes defined to mean not just that the views of the primitives in the images have similar colors but, instead, that they have similar distributions of color. In other words, a primitive should be included in the model if the photographs see similar clusters of color at the primitive.

Because related art methods rely on mean and variance values to test for color consistency, these methods are inappropriate for characterizing multi-modal distributions of color. For example, when a surface in a scene has an edge with blue on one side and red on the other, a modeling primitive that spans the edge would project to mostly blue pixels and red pixels in a photograph of the surface. The mean of these pixels would be purple, even though the scene might contain no purple.

Since variance measures the degree to which a set of samples differs from their mean, in bimodal images, color consistency tests based on variance or on the likelihood ratio test would measure the degree to which the photographs see colors close to purple, a color not in the scene, at the primitive. With no color close to purple, the variance would be large, just as it would be with a random set of colors. However, the set of red pixels and blue pixels is not random. Thus, variance is "blind" to the structure in multi-modal sets.

Conversely, histograms are well suited for characterizing multi-modal distributions of color. For example, when multiple clusters are present in a set of colors, histograms do not blend the colors into an average color that may not be close to any color in the set. With respect to the case of the surface with red and blue on either side of an edge and a modeling primitive that spans the edge, the voxel or other primitive would be visible as mostly red pixels and blue pixels in a photograph that views the surface. Unlike in methods using a variance value, a histogram-based method would correctly record that some of the pixels are red and some are blue. Hence, a color consistency test based on histograms yields better reconstructions than tests based on means and variances. This has also been confirmed experimentally.

As illustrated in FIG. 2A, viewpoint can have a large influence on the average color viewed at a modeling primitive when the primitive spans a color boundary. In contrast, the viewpoint has much less influence on the color histogram. In FIG. 2A, both cameras 40, 50 see black and white pixels but the first camera 40 sees mostly black and the second cameral 50 sees mostly white. The color variance across these views is large, so a color consistency test based on variance is likely to misclassify the voxel or other primitive as a non-surface. The color distributions seen by the cameras 40, 50, however, are similar in that they both consist of a black cluster and a white cluster. Thus, the histograms for the two cameras 40, 50 intersect and the color consistency tests of the present invention correctly classify the voxel or other primitive as being part of the surface.

Figure 2B:
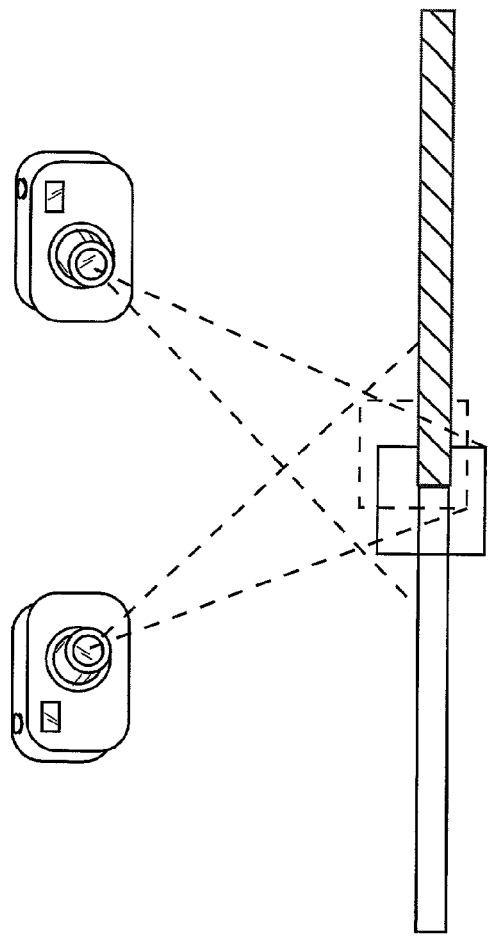
FIG. 2B illustrates two cameras that are imperfectly calibrated. The computed visibility sets for a voxel would be slightly incorrect if computed based on images obtained by these cameras.

Slight errors in camera calibration, which are nearly inevitable, can cause the same effect as changing the viewpoint. This is illustrated in FIG. 2B. When the camera location data is slightly in error, a modeling primitive being projected into an image will be projected as though it were shifted slightly in position. In the example in FIG. 2B, the first camera 40 sees mostly black pixels and the second camera 50 sees mostly white at the voxel or other primitive, just as in the example in FIG. 2A. Hence, everything that was said about variance-based and histogram-based consistency tests for the example in FIG. 2A, also applies to the example in FIG. 2B. Thus, the histogram-based color consistency tests of the present invention are more tolerant of calibration errors than those based on variance.

Figure 6:
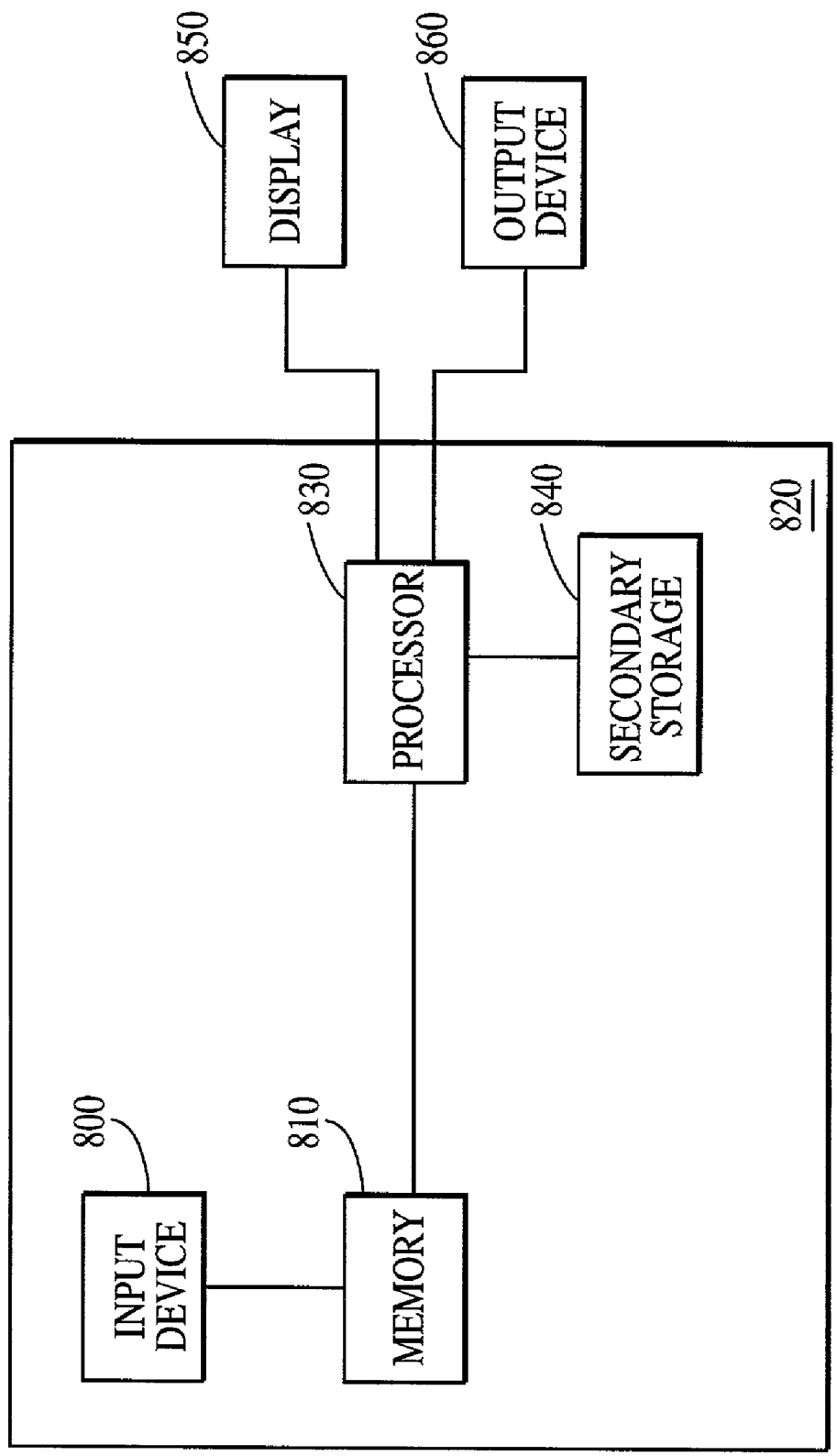
FIG. 6 illustrates a device that can read and implement computer program products that contain algorithms according to certain embodiments of the present invention.

In certain embodiments of the present invention, the algorithms and methods discussed above can come in the form of a computer program product. As shown in FIG. 6, the computer program product can be input through an input device 800, stored in a memory 810, and run on a processor 830. It can also be stored on a secondary storage device 840. Generally, the product is in the form of a computer-readable medium that contains instructions for controlling a computer system 820 and can be output to a display 850 or other output device 860. More specifically, the instructions control the computer system 820 to perform one of the methods of measuring color consistency discussed above.

The consistency measures used in the histogram-based consistency measures of the present invention have a minimal impact on the memory requirements of the computers or processors that run software based on the algorithms. In one of the examples discussed above, 512 histogram bins were used and, since one bit of memory can be used per bin, only 64 bytes may be needed per histogram. Further, since one histogram can be used per image to efficiently implement the methods presented above, since the images can be kept in the processor memory, and since each image consumes approximately one megabyte, the memory requirements of the present invention can be relatively inconsequential.

Figure 3:
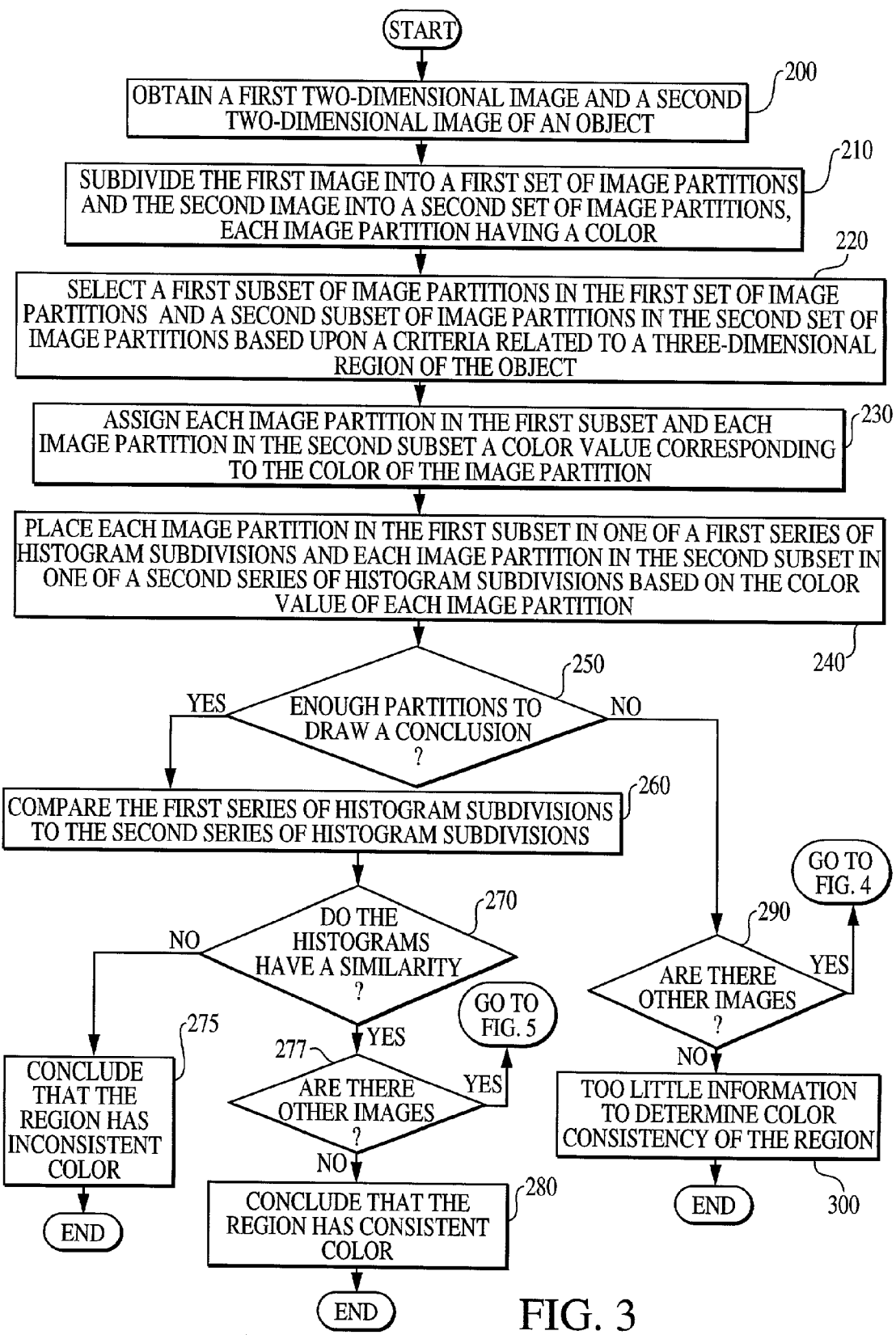
FIG. 3 illustrates a flowchart of the steps of a color consistency method according to certain embodiments of the present invention when two images of the object being modeled are available.

FIG. 3 illustrates a flowchart that contains the steps of one color consistency method according to the present invention, preferably executed by the processor 830. Step 200 specifies that a first two-dimensional image and a second two-dimensional image of an object are obtained. These images may be, for example, photographs or digital images. Step 210 specifies that the first images is subdivided into a first set of image partitions and that the second image is subdivided into a second set of image partitions, each image partition having a color. Since image partitions can be pixels, step 210 can also subdivide the images into pixels.

Step 220 specifies that a first subset of image partitions, in the first set of images partitions, is selected and that a second subset of image partitions, in the second set of image partitions, is selected based upon a criteria related to a three-dimensional region of the object. This step preferably includes, in each of the first and second images, only those pixels that correspond to locations being modeled in a subset of pixels that is used in the remainder of the analysis.

Step 230 specifies that each image partition in the first subset and each image partition in the second subset is assigned a color value corresponding to the color of the image partition. Hence, step 230 preferably assigns each of the pixels in the chosen subsets a color based on the image of the pixel.

Step 240 specifies that each image partition in the first subset is placed in one of a first series of histogram subdivisions and that each image partition in the second subset is placed in one of a second series of histogram subdivisions, based on the color value of each image partition. In other words, the color values of each pixel can be used to place each pixel into one of the bins of a histogram. These bins can either be small bins consistent with the histogram subdivisions discussed above or they can be larger, aggregate bins also referred to as histogram partitions.

Step 250 asks whether enough pixels or partitions are included in the first and second histograms to draw a meaningful conclusion. In other words, step 250 preferably questions whether enough pixels represent the portion of the object being modeled to provide enough information concerning the color consistency of the portion.

If enough pixels or partitions are included, then step 260 specifies that the first histogram are compared to the second histogram. Then, step 270 asks whether a similarity exists between the histograms. A similarity can mean that at least one of the bins in the first histogram is filled with one or more pixels and that at least one of the corresponding bins in the second histogram is also filled. If no two corresponding bins are filled, then the histograms may not have a similarity.

When the histograms do not have a similarity, the flowchart in FIG. 3 proceeds to step 275, which concludes that the region has an inconsistent color. Then, the flowchart comes to an end. However, when a similarity does exist, step 277 asks whether there are other images that can be examined. If there are no other images, then step 280 concludes that the region has a consistent color. At this point, according to certain embodiments, the region may be added to the model. If there are other images, then the flowchart proceeds to FIG. 5.

When, pursuant to step 250, it is determined that not enough pixels or partitions are included in the first and second histograms to draw a meaningful conclusion, step 290 asks whether any other images are available. If no other images are available, step 300 specifies that there is too little information to determine whether the region is color consistent. In such instances, in certain embodiments of the present invention, the region may not be operated on until further information concerning the region can be obtained. This preferably places the voxel in a state of limbo until more information, such as more images, is obtained. If other images are available, the method continues to the steps of the flowchart illustrated in FIG. 4.

Figure 4:
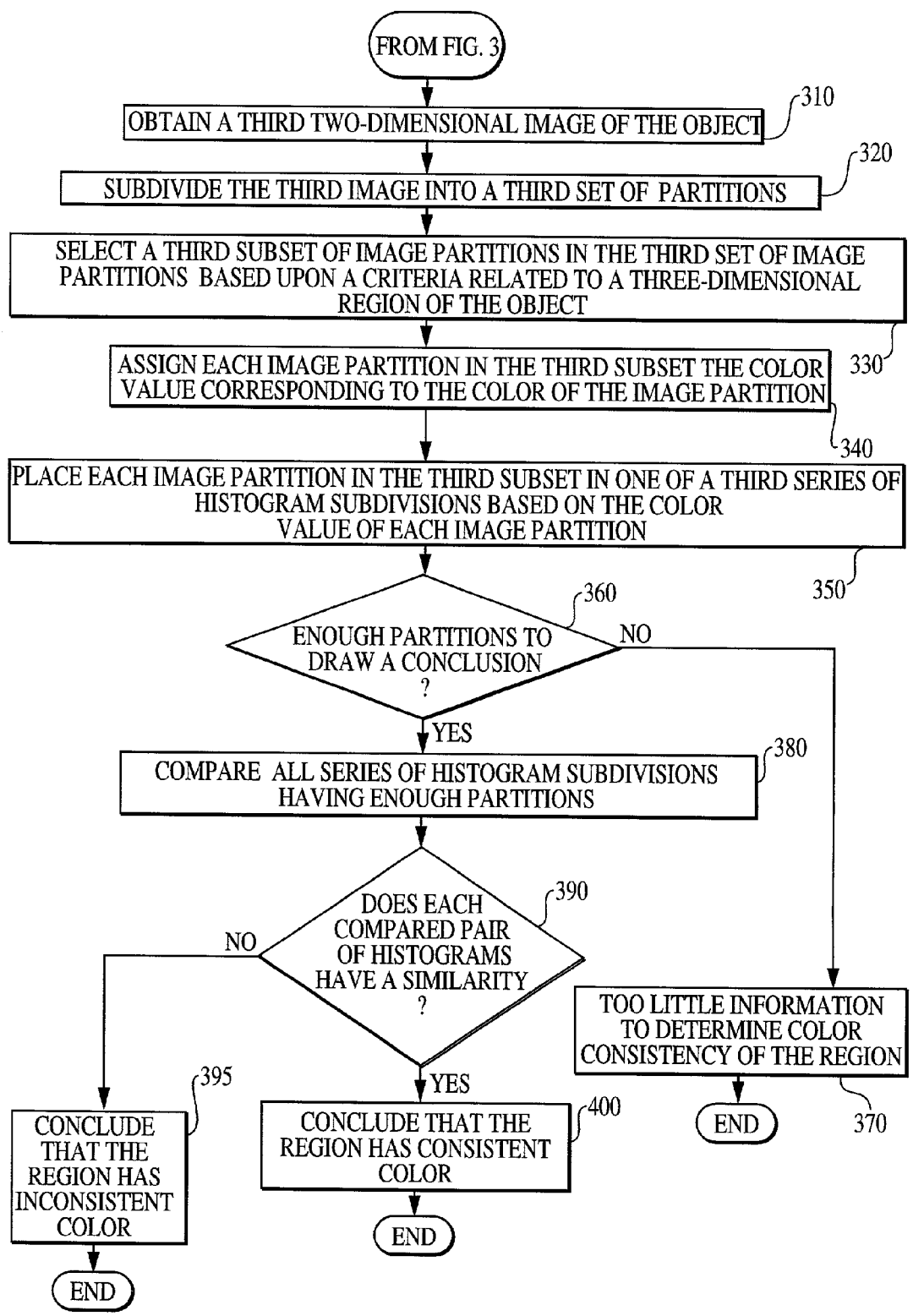
FIG. 4 illustrates a continuation of the flowchart in FIG. 3 when three images of the object are available and when the two images of FIG. 3 include too few partitions to allow for a determination of the color consistency of the region or voxel to be made.

FIG. 4 illustrates a continuation of the flowchart in FIG. 3 when too few partitions were available in the first and second images discussed above and a third image is available. Although FIG. 4 only specifies a third, two-dimensional image, some methods according to the present invention may utilize many additional images, when available.

Step 310 specifies obtaining a third, two-dimensional image and step 320 specifies subdividing the third image into a third set of partitions. Step 330 then specifies selecting a third subset of image partitions in the third set of image partitions and that the selection is based upon a criteria related to a three dimensional region of the object. In other words, as with the first two images, a subset of pixels that represent the region of the object being modeled can be selected from the third image or photo.

Step 340 assigns each image partition in the third subset of image partitions the color value corresponding to the color of that image partition in the third image. Step 350 then specifies that each image partition in the third subset is placed in one of a third series of histogram subdivisions, based on the color value of each image partition. Again, as with the first two images, color values can be assigned to each selected pixel, based on the color of the region of the region imaged by the pixel, and the pixels can be used to form a color histogram.

Step 360 then asks whether enough pixels or partitions are included to draw a meaningful conclusion. If not enough pixels or partitions are included, then step 370 specifies that too little information is available to determine whether the region is color consistent. According to certain embodiments of the present invention, pursuant to step 370, the region is not operated on until further information concerning the region can be obtained. This preferably places the voxel in a state of limbo until more information, such as more images, is obtained.

When enough pixels or partitions are included, the step 380 specifies that all of the series of histogram subdivisions that contain enough partitions are compared to each other. Then, step 390 asks whether each pair of histograms that were compared in step 380 have a similarity. If the compared histograms do contain a similarity, then step 400 concludes that the region has consistent color. This means that the region may be added to the model.

When any of the pairs of histograms that were compared to each other fail to have a similarity, then step 395 concludes that the region is color inconsistent. In this case, the region may not be added to the model and the method ends.

Figure 5:
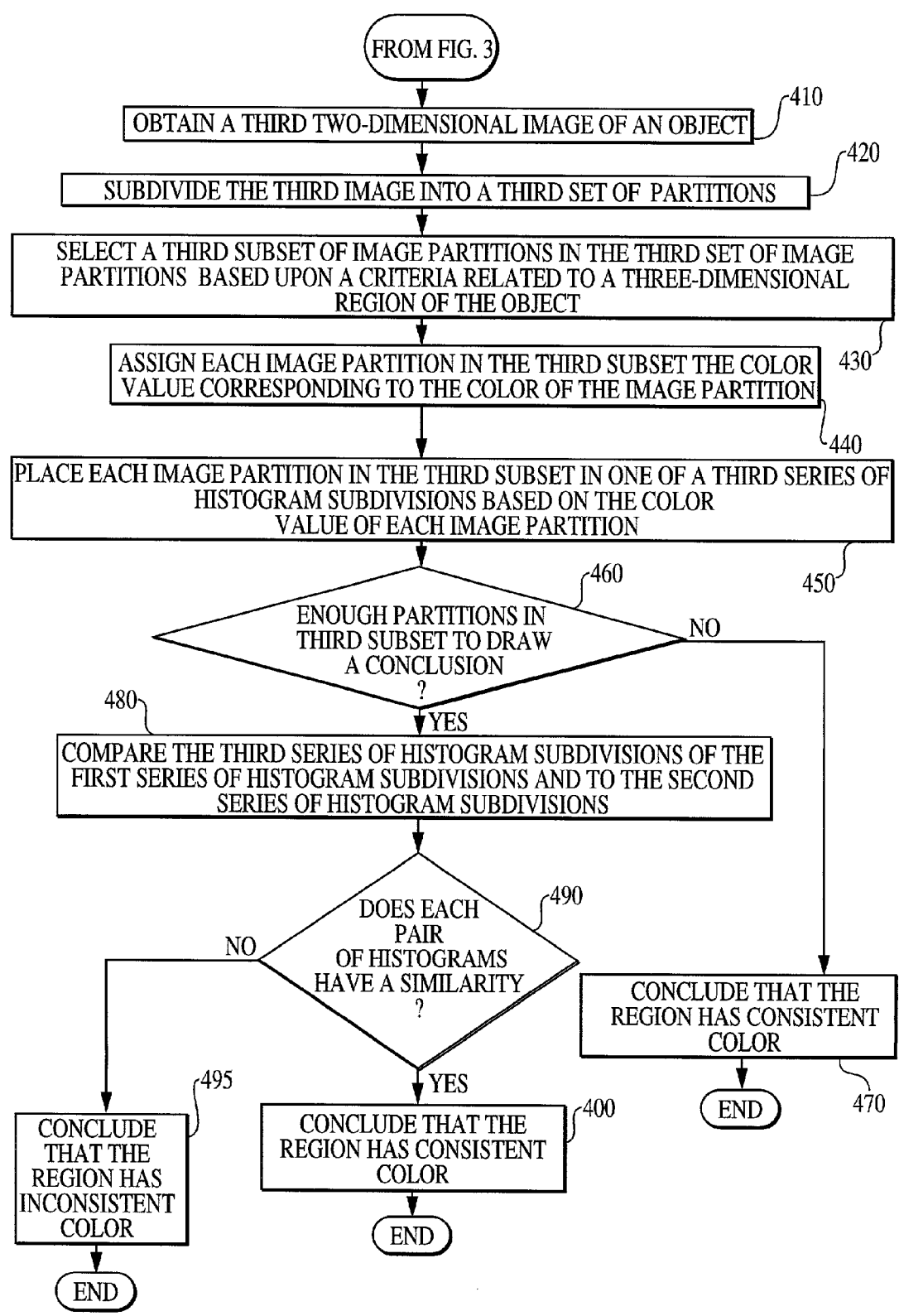
FIG. 5 illustrates a continuation of the flowchart in FIG. 3 when three images of the object are available and when the two images of FIG. 3 include enough partitions to allow for a preliminary determination concerning the color consistency of the region or voxel to be made.

FIG. 5 illustrates another continuation of the flowchart in FIG. 3 that is used when enough partitions were available in the first and second images discussed above but when a third image is also available. Although FIG. 5 only specifies a third, two-dimensional image, some methods according to the present invention may utilize many additional images, when available.

Step 410 specifies obtaining a third, two-dimensional image and step 420 specifies subdividing the third image into a third set of partitions. Step 430 then specifies selecting a third subset of image partitions in the third set of image partitions and that the selection is based upon a criteria related to a three dimensional region of the object. In other words, as with the first two images, a subset of pixels that represent the region of the object being modeled can be selected from the third image or photo.

Step 440 assigns each image partition in the third subset of image partitions the color value corresponding to the color of that image partition in the third image. Step 450 then specifies that each image partition in the third subset is placed in one of a third series of histogram subdivisions, based on the color value of each image partition. Again, as with the first two images, color values can be assigned to each selected pixel, based on the color of the region of the region imaged by the pixel, and the pixels can be used to form a color histogram.

Step 460 then asks whether enough pixels or partitions are included in the third image to draw a meaningful conclusion. If not enough pixels or partitions are included, then step 470 concludes that the region has consistent color. Pursuant to step 470, the region may then be added to the model.

When enough pixels or partitions are included, the step 480 compares the third series of histogram subdivisions to the first series of histogram subdivisions and to the second series of histogram subdivisions. Then, step 490 asks whether each pair of histograms that were compared in step 480 have a similarity. If the compared histograms do contain a similarity, then step 500 concludes that the region has consistent color. This means that the region may be added to the model.

When any of the pairs of histograms that were compared to each other fail to have a similarity, then step 495 concludes that the region is color inconsistent. In this case, the voxel or region may not be added to the model and the method ends.

Although the above embodiments are representative of portions of the present invention, other embodiments of the present invention will be apparent to those skilled in the art from a consideration of the above discussion or practice of the present invention disclosed herein. It is intended that the above discussion and examples be considered as exemplary only, with the true scope of the present invention being determined by the claims and their equivalents.

We claim:

1. A computer program product, comprising:
  a computer-readable medium containing instructions for controlling a computer system to perform a method of measuring color consistency, the method comprising:
    obtaining a first two-dimensional image and a second two-dimensional image of an object;
    subdividing the first image into a first set of image partitions and the second image into a second set of image partitions, each image partition having a color;
    selecting a first subset of image partitions in the first set of image partitions and a second subset of image partitions in the second set of image partitions based upon a criteria related to a three-dimensional region of the object;
    placing each image partition in the first subset in one of a first series of histogram subdivisions and each image partition in the second subset in one of a second series of histogram subdivisions based on the color value of each image partition;
    comparing the first series of histogram subdivisions to the second series of histogram subdivisions; and
    including the region in a three-dimensional model of the object if the first series of histogram subdivisions and the second series of histogram subdivisions have a similarity.

2. The computer program product of claim 1, wherein the method further comprises:
  obtaining a third two-dimensional image of the object;
  subdividing the third image into a third set of image partitions;
  selecting a third subset of image partitions in the third set of image partitions based upon the criteria related to a three-dimensional region of the object;
  assigning each image partition in the third subset a color value corresponding to the color of the image partition;
  placing each image partition in the third subset in one of a third series of histogram subdivisions based on the color value of each image partition;
  comparing the third series of histogram subdivisions to the first series of histogram subdivisions and the second series of histogram subdivisions; and
  determining what to do with the region based on whether each if the first, second, and third series of histogram subdivisions has at least one similarity with each of the other histogram subdivisions.

* * * * *

UNITED STATES PATENT AND TRADEMARK OFFICE
CERTIFICATE OF CORRECTION

PATENT NO. : 7,181,064 B1 Page 1 of 1
APPLICATION NO. : 09/987918
DATED : February 20, 2007
INVENTOR(S) : Mark R. Stevens et al.

It is certified that error appears in the above-identified patent and that said Letters Patent is hereby corrected as shown below:

On the face page, in field (75), in "Inventors", in column 1, line 1, delete "Worcester," and insert -- Bedford, --, therefor.

In column 3, line 35, delete "s found" and insert -- is found --, therefor.

In column 14, line 35, in Claim 2, after "and" insert -- to --.

In column 14, line 38, in Claim 2, delete "if" and insert -- of --, therefor.

Signed and Sealed this

Fifteenth Day of December, 2009

David J. Kappos
*Director of the United States Patent and Trademark Office*